United States Patent
Lin

(10) Patent No.: US 9,105,212 B2
(45) Date of Patent: Aug. 11, 2015

(54) METHOD FOR GRADUALLY ADJUSTING SCREEN BRIGHTNESS WHEN SWITCHING OPERATING SYSTEM

(71) Applicant: HTC Corporation, Taoyuan County (TW)

(72) Inventor: Chien-Liang Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/243,907

(22) Filed: Apr. 3, 2014

(65) Prior Publication Data

US 2014/0210846 A1 Jul. 31, 2014

Related U.S. Application Data

(63) Continuation of application No. 11/971,198, filed on Jan. 8, 2008, now Pat. No. 8,730,270.

(60) Provisional application No. 60/969,962, filed on Sep. 5, 2007.

(51) Int. Cl.
   G09G 5/10 (2006.01)
   G09G 5/00 (2006.01)
   G06F 3/14 (2006.01)
   G09G 3/34 (2006.01)

(52) U.S. Cl.
   CPC ........ *G09G 5/003* (2013.01); *G06F 3/14* (2013.01); *G09G 5/10* (2013.01); *G09G 3/3406* (2013.01); *G09G 2320/064* (2013.01); *G09G 2320/0653* (2013.01); *G09G 2360/144* (2013.01)

(58) Field of Classification Search
   CPC .......... G06F 3/14; G06G 5/10; G09G 3/3406; G09G 2320/0653; G09G 2360/144; G09G 2320/064
   USPC .......................................... 345/204–207, 690
   See application file for complete search history.

(56) References Cited

U.S. PATENT DOCUMENTS

| | | | | |
|---|---|---|---|---|
| 5,612,715 | A * | 3/1997 | Karaki et al. | 345/698 |
| 6,809,741 | B1 * | 10/2004 | Bates et al. | 345/597 |
| 6,976,180 | B2 | 12/2005 | Cupps et al. | |
| 7,184,003 | B2 | 2/2007 | Cupps et al. | |

(Continued)

FOREIGN PATENT DOCUMENTS

| CN | 1700175 | 11/2005 |
|---|---|---|
| TW | I271692 | 1/2007 |

*Primary Examiner* — Christopher E Leiby
(74) *Attorney, Agent, or Firm* — CKC & Partners Co., Ltd.

(57) ABSTRACT

A method for gradually adjusting screen brightness when switching an operating system is provided. The method is used for gradually adjusting the brightness of a screen of an electronic device by a controller thereof when the electronic device is switched from to first operating system to a second operating system. First, an operating system switching signal is received. Then, a first brightness value of the first operating system is obtained. The screen brightness is gradually adjusted from the first brightness value to a predetermined second brightness value. Afterwards, the first operating system is switched to the second operating system, and the screen brightness is further adjusted from the second brightness value back to the first brightness value. Accordingly, a user can sense the switching of the operating system more intuitively and has enough time to get used to the change of the screen brightness and the displayed frame.

21 Claims, 7 Drawing Sheets

(56) References Cited

U.S. PATENT DOCUMENTS

| | | | |
|---|---|---|---|
| 7,411,577 B2* | 8/2008 | Kim et al. | 345/156 |
| 7,605,829 B2* | 10/2009 | Oh | 345/690 |
| 2001/0021267 A1 | 9/2001 | Jun et al. | |
| 2004/0104922 A1* | 6/2004 | Kawano | 345/690 |
| 2004/0223007 A1* | 11/2004 | Mamata | 345/690 |
| 2006/0010314 A1 | 1/2006 | Xu | |
| 2006/0285819 A1* | 12/2006 | Kelly et al. | 386/52 |
| 2007/0038875 A1 | 2/2007 | Cupps et al. | |
| 2007/0043961 A1 | 2/2007 | Cupps et al. | |
| 2007/0268200 A1* | 11/2007 | Fuller et al. | 345/1.1 |

\* cited by examiner

METHOD FOR GRADUALLY ADJUSTING SCREEN BRIGHTNESS WHEN SWITCHING OPERATING SYSTEM

CROSS-REFERENCE TO RELATED APPLICATION

This application is a continuing, application of U.S. application Ser. No. 11/971,198, filed on Jan. 9, 2008. In addition, the original application, Ser. No. 11/971,198, claims the priority benefit of U.S. provisional application Ser. No. 60/969,962, filed on Sep. 5, 2007. The entirety of the above-mentioned patent application is hereby incorporated by reference herein and made a part of this specification.

BACKGROUND OF THE INVENTION

1. Field of the Invention

The present invention generally relates to a method for adjusting screen brightness, and more particularly, to a method for gradually adjusting screen brightness when switching an operating system.

2. Description of Related Art

To keep up with the bustling pace of modern human life, various portable and space-saving electronic devices have been put forward one after another. For example, smart phones are not only equipped all functions of a conventional communication device, but also allow users to achieve purposes such as document writing. E-mail receiving/sending, network accessing, or the use of real-time communication software through a built-in Windows operating system (Windows OS). That is to say, such hand-held communication devices may not only be used to make phone calls, but also serves as a miniature PC with versatile functions. Further, with the progress of wireless network technology, those functions can be used free from time and space limitations. Therefore, such devices have become an indispensable tool in a modern life in pursuit of efficiency.

The architecture of such hand-held communication devices has an embedded system, and works through a Windows mobile OS such as Windows CE. However, the function of the Windows mobile OS may be limited by the performance of the processor used in the hand-held communication device, and cannot achieve the multiplexed and diversified functions of an ordinary computer operating system. For example, a Windows OS such as Windows XP or Windows VISTA used in a PC is capable of processing complicated tasks like text edition and image processing, thus having a higher performance as compared with the Windows mobile OS. In order to improve the performance of the portable electronic devices, a brand new architecture integrating the portability of the Windows mobile OS and functionality of the Windows OS of a PC is developed.

During the actual operation of the above dual operating system architecture, only one operating system works while the other stands by, so as to alternately utilize the shared system resources. When a user intends to change the current operating system into the other operating system, the user ma may press a switching key on the device to switch to the desired operating system, and meanwhile switch the operating system frame displayed on the screen.

However, the problem of directly switching an operating system frame to the other is that, as the two operating systems have different brightness settings or display different frames, the frame on the screen after switching may become too dark, too bright, or glaring, thus causing discomfort to the user when viewing the screen. Therefore, it is necessary to provide a method to smoothly and fluently switch the frames of the dual operating system architecture.

SUMMARY OF THE INVENTION

Accordingly, the present invention is directed to a method for gradually adjusting screen brightness when switching an operating system. During the switching of an operating system, an independent embedded controller (EC) is employed to obtain a brightness value of the previous operating system, and gradually adjust the screen brightness by means of fade in and fade out, so as to alleviate the discomfort caused by the sudden change of the frame displayed on the screen.

As embodied and broadly described herein, a method for gradually adjusting screen brightness when switching an operating system is provided. The method is used for gradually adjusting the brightness value of to screen of an electronic, device by a controller thereof when the electronic device is switched from a first operating system to a second operating system, and includes the following steps. First, an operating system switching signal is received. Then, a first brightness value of the first operating system is obtained. The screen brightness is gradually adjusted from the first brightness value to a predetermined second brightness value. Afterwards, the first operating system is switched to the second operating system, and the screen brightness is further adjusted from the second brightness value back to the first brightness value.

In an embodiment of the present invention, the method for gradually adjusting screen brightness further includes transmitting the received first brightness value to the second operating system.

In an embodiment of the present invention, the above step of receiving the operating system switching signal includes: first determining whether a switching key of the electronic device is triggered; when the switching key is triggered, generating the operating system switching signal; and then receiving the operating system switching signal generated by the switching key.

In an embodiment of the present invention, the switching key is a physical key disposed on the electronic device or a virtual key displayed on the screen of the electronic device.

In an embodiment of the present invention, the step of obtaining the first brightness value of the first operating system includes the following steps. First, it is determined whether the first operating system operates in a working mode. If it is determined that the first operating system operates in the working mode, a brightness value request message is sent to the first operating system. Then, the first brightness value sent back by the first operating system according to the brightness value request message is received. On the other hand, if it is determined that the first operating system does not operate in the working mode, the first brightness value of the first operating system is read from a memory built in the controller.

In an embodiment of the present invention, the first brightness value of the first operating system recorded in the memory is stored at a set time when the first operating system operates in the working mode or before the first operating system leaves the working mode.

In an embodiment of the present invention, the step of obtaining the first brightness value of the first operating system includes directly reading the first brightness value of the first operating system from a memory bulk in the controller.

In an embodiment of the present invention, after the step of adjusting the first brightness value to the second brightness value, the method further includes maintaining the screen brightness at the second brightness value for a predetermined period of time, and after the predetermined period of time gradually adjusting the screen brightness from the second brightness value back to the first brightness value.

In an embodiment of the present invention, the step of gradually adjusting the screen brightness from the second brightness value back to the first brightness value further includes detecting a current ambient brightness value; adjusting the first brightness value according to the ambient brightness value; and gradually adjusting the screen brightness from the second brightness value back to the adjusted first brightness value.

In an embodiment of the present invention, the step of adjusting the first brightness value according to the ambient brightness value includes the following steps. It is determined whether the ambient brightness value is greater than or equal to a predetermined brightness value. If the ambient brightness value is greater than or equal to the predetermined brightness value, the first brightness value is adjusted upwardly by a first ratio. On the contrary, if the ambient brightness value is smaller than the predetermined brightness value, the first brightness value is adjusted downwardly by a second ratio.

In an embodiment of the present invention, the steps of gradually adjusting the screen brightness from the first brightness value to a predetermined second brightness value and gradually adjusting the screen brightness from the second brightness value back to the first brightness value are performed according to a curve function. In addition, the second brightness value includes a full-black value.

In an embodiment of the present invention, the step of gradually adjusting the screen brightness of the electronic device is performed by a pulse width modulation (PWM) module disposed in the controller.

In an embodiment of the present invention, the controller includes an EC, and the electronic device is a notebook, an ultra mobile PC (UMPC), or a personal digital assistant (PDA).

According to the present invention, during the switching of an operating system, an independent EC is employed to obtain a brightness value of the previous operating system, and to control the screen to gradually become dark from the obtained brightness value. After switched to the frame of the other operating system, the screen is gradually adjusted to the original brightness value. As such, a method to smoothly switch the displayed frame is provided for alleviating the discomfort caused by the sudden change of the screen brightness.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
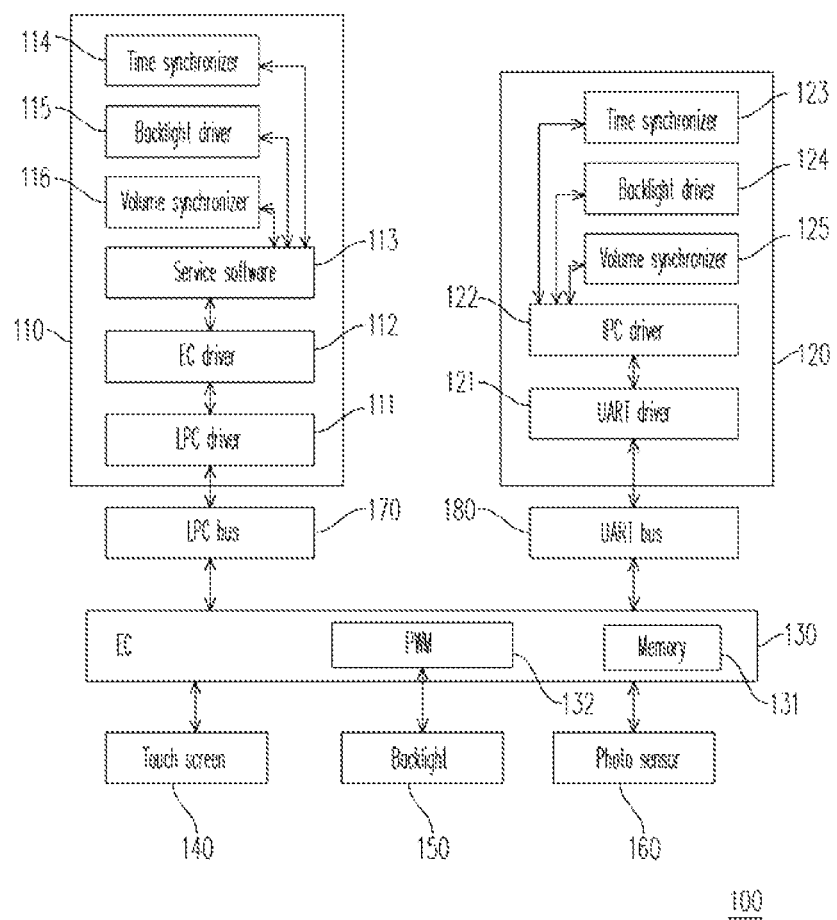
FIG. 1 is a block diagram of a device using a dual operating system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

When a device installed with a dual operating system is used as the screen of the device only displays the operating frame of one operating system at a time, the user has to switch between the two operating systems during operation. However, when the frame of the operating system is switched, the screen brightness jumps from a predetermined value of a previous operating system to a predetermined value of next operating system, and meanwhile the content of the displayed frame on the screen changes accordingly, thus resulting in discomfort to eyes of the user. If the predetermined brightness value of the previous operating system can be obtained first and directly used in the operating system after switching, and the frame of the operating system is switched in a fade in and a fade out manner, the user may have a better visual perception. Based on the above concept, the present invention provides a method for gradually adjusting screen brightness when switching an operating system. In order to make the content of the present invention more apparent, the embodiments of the present invention are described below.

FIG. 1 is a block diagram of a device using a dual operating system according to an embodiment of the present invention. Referring to FIG. 1, the device 100 using a dual operating system of this embodiment mainly includes a Windows OS 110 (for example, Windows XP or Windows VISTA), a Windows mobile OS 120 (for example, Windows CE), and an embedded controller (EC) 130. The electronic device 100 is, for example, but not limited to, a notebook, a UMPC, or a PDA.

The EC 130 is connected to peripheral hardware devices such as a contact screen 140, a backlight module 150, and an optical sensor 160 of the device 100 using a dual operating system. In addition, other peripheral hardware devices may include a keyboard, battery cell, webcam, display, speaker (not shown), and so on, which are shared by the two operating systems.

Further, the EC 130 is also connected to a low pin count (LPC) bus 170 driven by an LPC driver 111 of the Windows OS 110, and is driven by an EC driver 112, so as to communicate with the Windows OS 110 through an LPC interface. In detail, through service software 113 of the Windows OS 110, the EC 130 is communicated with a time synchronizer 114, a backlight module driver 115 and a volume synchronizer 116 of the Windows OS 110, for controlling the operation of peripheral hardware devices such as the backlight module 150 and the speaker (not shown) of the electronic device 100.

Similarly, the EC 130 is also connected to a universal asynchronous receiver transmitter (UART) bus 180 driven by a UART driver 121 of the Windows mobile OS 120, so as to communicate with the Windows mobile OS 120 through a UART interface. In detail through an Interprocess Communication (IPC) driver 122 of the Windows mobile OS 120, the EC 130 is communicated with a time synchronizer 123, a backlight module driver 124, and a volume synchronizer 125 of the Windows mobile OS 120, for controlling the operation of peripheral hardware devices such as the backlight module 150 and the speaker (not shown) of the electronic device 100. It should be noted that the adopted LPC interface and UART interface are described here as an embodiment, instead of limiting the scope of the present invention.

The present invention provides a universal message format to enable the communication between the Windows OS 110, Windows mobile OS 120, and EC 130. By transmitting, this message, the above three units may order other units to carry out specific tasks or transmit data to other units.

Figure 2:
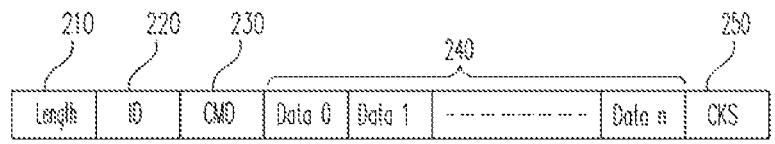
FIG. 2 is a schematic diagram of a message format according to an embodiment of the present invention.

FIG. 2 is a schematic diagram of a message format according to an embodiment of the present invention. Referring to FIG. 2, the head of the message 200 is a length area 210 indicating an effective length of the message 200. An identification (ID) area 220 indicating a start and a destination of the message 200 follows the head. Then, a command (CMD) area 230 includes an instruction for commanding a destination unit. Subsequently, a data area 240 including a plurality of data Data 0 to Data n provides data required by the destination unit for executing the instruction. A checksum (CKS) area 250 is added at last for assisting the destination unit to ensure the completeness of the content of the message.

Through the transmission of the message in the above embodiment, a communication channel among the Windows OS 110, Windows mobile OS 120, and EC 130 is built. As such, a method of adjusting screen brightness of the present invention may be implemented, and the method is illustrated in detail below.

Figure 3:
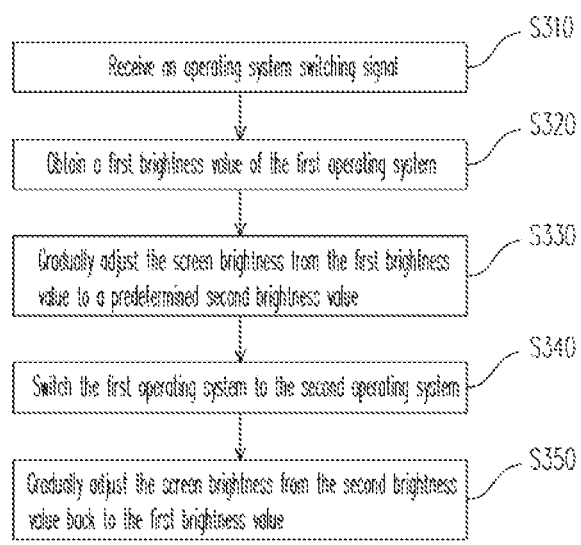
FIG. 3 is a flow chart of a method for gradually adjusting the sere brightness when switching an operating according to an embodiment of the present invention.

FIG. 3 is a flow chart of a method for gradually adjusting screen brightness when switching an operating system according to an embodiment of the present invention. Referring to FIG. 3, this embodiment is used for gradually adjusting the brightness value of a screen of an electronic device (for example, the device 100 using a dual operating system in the above embodiment) by a controller thereof when the electronic device is switched from a first operating system to a second operating system. The above first and second operating systems are, for example, but not limited, to, any combination of Windows OS and Windows mobile OS. The method of adjusting screen brightness of this embodiment has the following steps.

First, an operating system switching signal is received (Step S310). The operating system switching signal is, for example, triggered by a switching key on the electronic device. In detail, during the operation of the electronic device, it is continuously detected whether the switching key is triggered. When the switching key is triggered, the operating system switching signal is generated and then transmitted to the controller of the electronic device. Thereafter, the controller executes the subsequent process. In addition, the switching key is, for example, but not limited to, a physical key disposed on the electronic device or a virtual key displayed on the screen of the electronic device.

After receiving the operating system switching signal, the controller automatically obtains a first brightness value of the first operating system (Step S320). For example, the first brightness value, recorded in a built-in memory of the controller, is stored at a set time when the first operating system operates in the working mode or before the first operating system leaves the working mode. Therefore, the controller only needs to read the first brightness value of the first operating system from the built-in memory of the controller.

Figure 4:
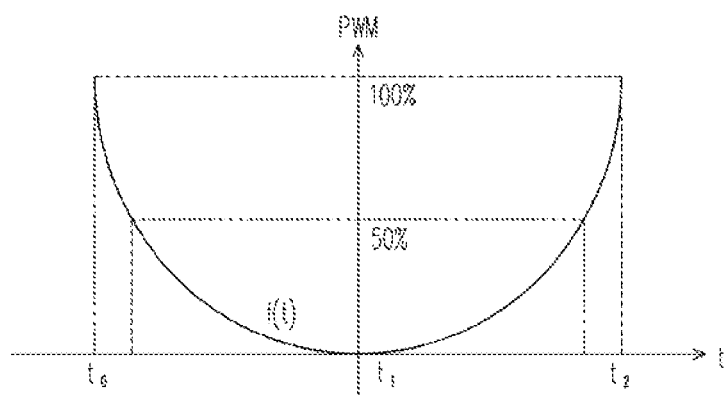
FIG. 4 is a curve graph of the screen brightness values according to an embodiment of the present invention.

After obtaining the first brightness value of the first operating system, the controller controls the backlight module of the screen to gradually adjust the screen brightness from the first brightness value to the predetermined second brightness value (Step S330). The brightness value of the screen is gradually adjusted by, for example, a pulse width modulation (PWM) module disposed in the controller, and the adjusting manner is, for example, gradually adjusting according to a curve function. For example, FIG. 4 is a curve graph of the screen brightness values according to an embodiment of the present invention. Referring to FIG. 4, the transverse axis is time, and the vertical axis is PWM values. The PWM value is the first brightness value at Time $t_0$, and is gradually adjusted with time in accordance with the pattern of the curve function f(t). Then, at Time $t_1$, the PWM value reaches the second brightness value (for example, a brightness value 0 representing the full-black).

When the screen brightness is adjusted to the second brightness value, the frame on the screen is switched from the first operating system to the second operating system (Step S340). As the frame on the screen is full-black, the first operating system ends, and the second operating system is actuated. Thus, the user can sense the switching of the operating system more intuitively and may not feel too abrupt.

After that, similarly, the controller controls the backlight module of the screen to gradually adjust the screen brightness from the second brightness value back to the first brightness value (Step S350). The first brightness value is also transmitted to the second operating system, and serves as a brightness value during the operation of the second operating system. After the screen brightness is adjusted back to the second brightness value, the user views the operating frame of the second operating system after switching, and the screen brightness remains the same settings as before switching. In this manner, the frame on the screen may not become glaring, too bright, or too dark due to a great change of the brightness, thereby making the user feel more comfortable to view the screen. It should be noted that in the above embodiment, the first brightness value of the first operating system is directly obtained from a built-in memory of the controller. Moreover, according to another embodiment of the present invention, the first brightness value may also be obtained from the controller, which will be illustrated in detail below.

Figure 5:
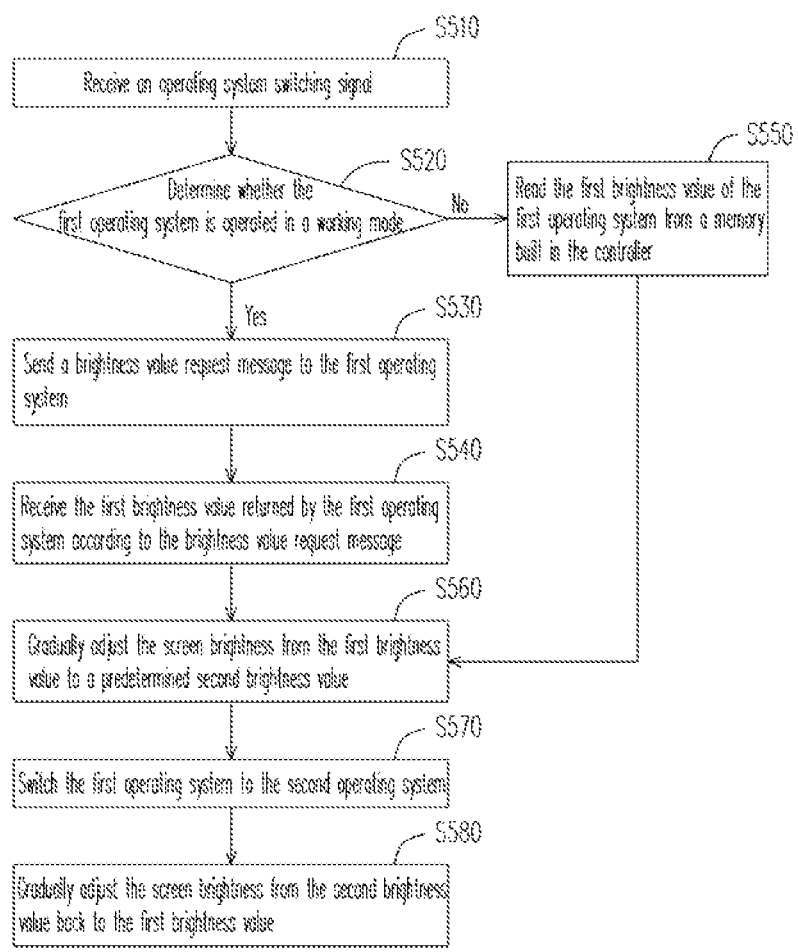
FIG. 5 is a flow chart of a method for gradually adjusting screen brightness when switching an operating system according to an embodiment of the present invention.

FIG. 5 is a flow chart of a method for gradually adjusting screen brightness when switching an operating system according to an embodiment of the present invention. Referring to FIG. 5, this embodiment is also suitable for gradually adjusting the brightness value of a screen of an electronic device when the electronic device is switched from a first operating system to a second operating system. The above first and second operating systems are, for example, but not limited to, any combination of Windows OS and Windows mobile OS. The method of adjusting screen brightness of this embodiment has the following steps.

First, an operating system switching signal is received (Step S510). The operating system switching signal is, for example, triggered by a switching key of the electronic device. In addition, the switching key is, for example, but not limited to, a physical key or a virtual key, similar to the above embodiment.

After receiving the operating system switching signal, the controller automatically obtains a first brightness value of the first operating system. Different from the above embodiment, in this embodiment, after receiving the operating system switching signal, the controller first determines whether the first operating system operates in a working mode (Step S520). If it is determined that the first operating system operates in a working mode, a brightness value request message in a format as shown in FIG. 2 is sent to the first operating system (Step S530) to request the first operating system to send back the brightness value thereof. Then, the first brightness value is received from the first operating system (Step S540). In addition, since the first brightness value is directly obtained from the first operating system, the first brightness value may be regarded as the latest and most correct brightness value.

On the other hand, in Step S520, if it is determined that the first operating system does not operates in a working mode, the controller reads the first brightness value of the first operating system from a built-in memory of the controller (Step S550). Different from the brightness value directly obtained from the first operating system, the brightness value recorded in the memory of the controller is stored in advance by the first operating system, and may not be the brightness value of the frame currently displayed on the screen. To prevent difficulty in obtaining a brightness value as the first operating system enters a standby, sleep, or power-off state, another alternative solution is provided as follows.

Similar to the above embodiment, after obtaining the first brightness value of the first operating system, controller controls the backlight module of the screen to gradually adjust the screen brightness from the first brightness value to a predetermined second brightness value (Step S560). When the screen brightness is adjusted to the second brightness value, the frame on the screen is switched from the first operating system to the second operating system (Step S570). Finally, the controller controls the backlight module of the screen again to gradually adjust the screen brightness from the second brightness value back to the first brightness value (Step S580). These steps are identical or similar to those in the above embodiment, so the details will not be described herein again.

In order to alleviate the discomfort to the user caused by the change of the content of the frames on the screen, the present invention further provides the following solutions. One solution is to prolong the time duration of the hull-black state of the screen, and the other solution is to dynamically adjust the restored brightness value of the screen according to an ambient brightness value detected by an optical sensor. The above two solutions will be illustrated below accompanied with embodiments respectively.

Figure 6:
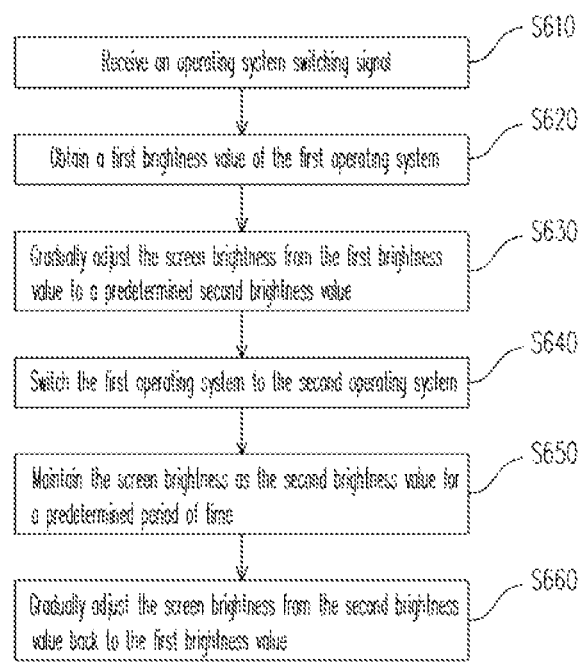
FIG. 6 is a flow chart of a method for gradually adjusting screen brightness when switching an operating system according to an embodiment of the present invention.

FIG. 6 is a flow chart of a method for gradually adjusting screen brightness when switching an operating system according to an embodiment of the present invention. Referring to FIG. 6, this embodiment is suitable for gradually adjusting the brightness value of a screen of an electronic device when the electronic device is switched from a first operating system to a second operating system. The above first and second operating systems are, for example, but not limited to, any combination of Windows OS and Windows mobile OS. The method of adjusting screen brightness of this embodiment has the following steps.

First, an operating system switching signal is received (Step S610). Then, a first brightness value of the first operating system is obtained (Step S620). After that, the controller controls the backlight module of the screen to gradually adjust the screen brightness from the first brightness value to a predetermined second brightness value (Step S630). When the screen brightness is adjusted to the second brightness value, the frame on the screen is switched from the first operating system to the second operating system (Step S640). These steps are identical or similar to those in the above embodiment, so the details will not be described herein again.

However, in this embodiment, after the screen brightness is adjusted to the second brightness value and the frame on the screen is switched from the first operating system to the second operating system, the screen brightness is maintained, at the second brightness value for a predetermined period of time (Step S650). As the screen brightness remains at a black state for a period of time, the user can sense the switching of the operating system more intuitively and has enough time to get used to the change of the screen brightness and the frame.

Figure 7:
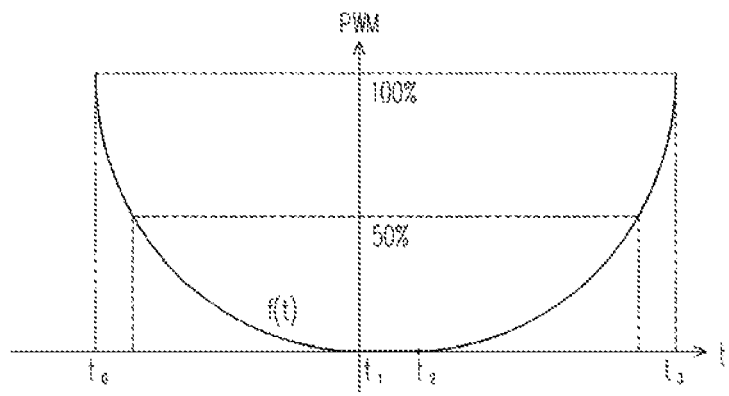
FIG. 7 is a curve graph of the screen brightness values according to an embodiment of the present invention.

After the above predetermined period of time, the controller gradually adjusts the screen brightness from the second brightness value back to the first brightness value in a similar manner (Step S660). For example, FIG. 7 is a curve graph of the screen brightness values according to an embodiment of the present invention. Referring to FIG. 7, the transverse axis is time, and the vertical axis is PWM values. The PWM value is the first brightness value at Time $t_0$, and is gradually adjusted with time in accordance with the pattern of the curve function f(t). Then, at Time $t_1$, the PWM value reaches the second brightness value (for example, a brightness value 0 representing the full-black). At this time, the PWM value remains at the second brightness value for a specific period of time (i.e., $t_1$-$t_2$), then is adjusted back to the first brightness value, and restores the original first brightness value at Time $t_3$.

Through the method of the above embodiment, the user has enough time to get used to the change of the screen brightness and the displayed frame, and thus feels more comfortable when viewing the screen. In another aspect, another embodiment is described below to illustrate in detail the process of adjusting the restored brightness value of the screen according to an ambient brightness value.

Figure 8:
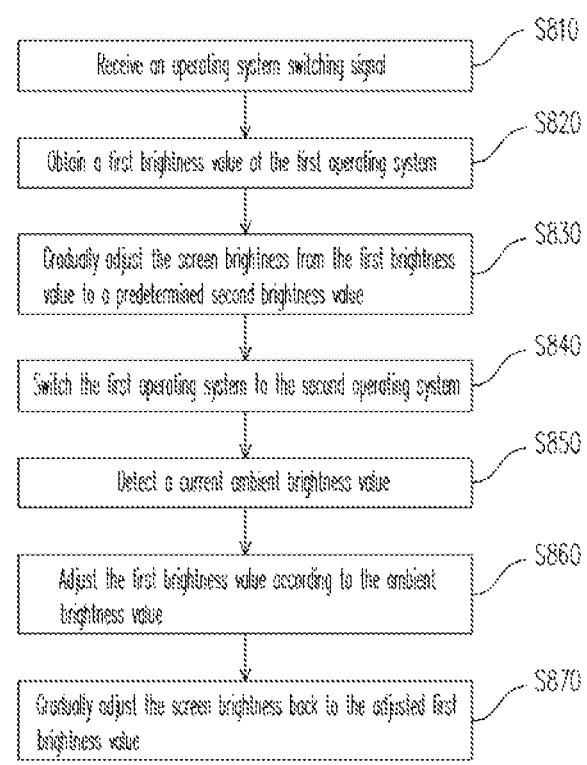
FIG. 8 is a flow chart of a method for gradually adjusting screen brightness when switching an operating system according to an embodiment of the present invention.

FIG. 8 is a flow chart of a method for gradually adjusting screen brightness when switching an operating system according to an embodiment of the present invention. Referring to FIG. 8, this embodiment is suitable for gradually adjusting the brightness value of a screen of an electronic device by a controller thereof when the electronic device is switched from as first operating system to a second operating system. The above first and second operating systems are, for example, but not limited to, any combination of Windows OS and Windows mobile OS. The method of adjusting screen brightness of this embodiment has the following steps.

First, an operating system switching signal is received (Step S810). Then, the controller automatically obtains a first brightness value of the first operating system (Step S820). After that, the controller controls the backlight module of the screen to gradually adjust the screen brightness from the first brightness value to a predetermined second brightness value (Step S830). When the screen brightness is adjusted to the second brightness value, the frame on the screen is switched from the first operating stem to the second operating system (Step S840). These steps are identical or similar to those in the above embodiment, so the details will not be described herein again.

However, in this embodiment, after the screen brightness is adjusted to the second brightness value and the frame on the screen is switched from the first operating system to the second operating system, an optical sensor (for example, the optical sensor 160 in FIG. 1) is used to detect a current ambient brightness value (Step S850), and the first brightness value is adjusted according to the ambient brightness value (Step S860). In addition, the above step of adjusting the first brightness value according to the ambient brightness value may be further divided into the following sub-steps. First, it is determined whether the ambient brightness value is greater than or equal to a predetermined brightness value. If the ambient brightness value is greater than or equal to the predetermined brightness value, the first brightness value is adjusted upwardly by a first ratio. On the contrary, if the ambient brightness value is smaller than the predetermined brightness value, the first brightness value is adjusted downwardly by a second ratio. Finally, when restoring the screen brightness, the screen brightness may restore the adjusted first brightness value (Step S870).

For example, if the detected ambient brightness value is greater than or equal to the predetermined brightness value, the first brightness value is adjusted upwardly by 5%, and consequently the screen brightness value is restored to the first brightness value being adjusted upwardly by 5%. On the contrary, if the detected ambient brightness value is smaller than the predetermined brightness value, the first brightness value is adjusted downwardly by 5%, and consequently the screen brightness value is restored to the first brightness value being adjusted downwardly by 5%. In this manner, the screen display is adjusted to be adapted to the change of the ambient, so as to reduce the difference between the adjusted brightness and the ambient brightness.

In view of the above, the method for gradually adjusting screen brightness of the present invention obtains a screen brightness value from a built-in memory of the controller or from the original operating system during the switching of the operating system. Besides, a fade in and a fade out manner are adopted to control the change of the screen brightness. Thus, the user can sense the switching of the operating system more intuitively, and may not feel discomfort when the screen brightness or the displayed frame on the screen changes. Further, by prolonging the time duration of the all-black state and adjusting the screen brightness according to an ambient brightness value, the user has enough time to get used to the change of the screen brightness and the displayed frame.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adjusting screen brightness when switching an operating system, used for adjusting a brightness value of a screen of an electronic device when the electronic device is switched from a first operating system to a second operating system, the method comprising:
   receiving an operating system switching signal;
   obtaining a first brightness value of the first operating system;
   adjusting the screen brightness from the first brightness value to a predetermined second brightness value;
   switching the first operating system to the second operating system; and
   adjusting the screen brightness from the second brightness value back to the first brightness value,
   wherein obtaining the first brightness value comprises:
      determining whether the first operating system operates in a working mode;
      in response to determining that the first operating system is operated in the working mode, sending a brightness value request message to the first operating system for acquiring the first brightness value utilized by the first operating system when the first operating system operates in the working mode; and
      in response to determining that the first operating system is not operated in the working mode, reading the first brightness value of the first operating system from a memory of the electronic device.

2. The method for adjusting screen brightness when switching an operating system according to claim 1, further comprising:
   transmitting the received first brightness value to the second operating system.

3. The method for adjusting screen brightness when switching an operating system according to claim 1, wherein the step of receiving the operating system switching signal comprises:
   determining whether a switching key of the electronic device is triggered;
   when the switching key is triggered, generating the operating system switching signal; and
   receiving the operating system switching signal generated by the switching key.

4. The method for adjusting screen brightness when switching an operating system according to claim 3, wherein the switching key is a physical key disposed on the electronic device or a virtual key displayed on the screen of the electronic device.

5. The method for adjusting screen brightness when switching an operating system according to claim 1, wherein the step of obtaining the first brightness value of the first operating system comprises:
   receiving the first brightness value sent back by the first operating system according to the brightness value request message.

6. The method for adjusting screen brightness when switching an operating system according to claim 5, wherein the controller comprises an embedded controller (EC).

7. The method for adjusting screen brightness when switching an operating system according to claim 5, wherein the first brightness value of the first operating system recorded in the memory is stored at a set time when the first operating system operates in the working mode or before the first operating system leaves the working mode.

8. The method for adjusting screen brightness when switching an operating system according to claim 1, wherein the first brightness value of the first operating system is obtained by a controller of the electronic device, the step of obtaining the first brightness value of the first operating system comprises:
   directly reading the first brightness value of the first operating system from a memory built in the controller.

9. The method for adjusting screen brightness when switching an operating system according to claim 8, wherein the controller comprises an embedded controller (EC).

10. The method for adjusting screen brightness when switching an operating system according to claim 1, after adjusting from the first brightness value to the second brightness value, further comprising:
    maintaining the screen brightness at the second brightness value for a predetermined period of time;
    adjusting the screen brightness from the second brightness value back to the first brightness value after the predetermined period of time.

11. The method for adjusting screen brightness when switching an operating system according to claim 1, wherein the step of adjusting the screen brightness from the second brightness value back to the first brightness value further comprises:
    detecting a current ambient brightness value;
    adjusting the first brightness value according to the ambient brightness value to obtain an adjusted first brightness value which is a function of both the first brightness value of the first operating system and the current ambient brightness value; and adjusting the screen brightness from the second brightness value to the adjusted first brightness value.

12. The method for adjusting screen brightness when switching an operating system according to claim 11, wherein the step of adjusting the first brightness value according to the ambient brightness value comprises:
   determining whether the ambient brightness value is greater than or equal to a predetermined brightness value;
   if the ambient brightness value is greater than or equal to the predetermined brightness value, upwardly adjusting the first brightness value by a first ratio to obtain the adjusted first brightness value; and
   if the ambient brightness value is smaller than the predetermined brightness value, downwardly adjusting the first brightness value by a second ratio to obtain the adjusted first brightness value.

13. The method for adjusting screen brightness when switching an operating system according to claim 1, wherein the second brightness value comprises a full-black value.

14. The method for adjusting screen brightness when switching an operating system according to claim 1, wherein the steps of adjusting the screen brightness from the first brightness value to a predetermined second brightness value and adjusting the screen brightness from the second brightness value back to the first brightness value are performed according to a curve function.

15. The method for adjusting screen brightness when switching an operating system according to claim 1, wherein the step of adjusting the screen brightness of the electronic device is performed by a pulse width modulation (PWM) module.

16. The method for adjusting screen brightness when switching an operating system according to claim 1, wherein the electronic device is a notebook, an ultra mobile PC (UMPC), or a personal digital assistant (PDA).

17. An electronic device, comprising:
   a first operating system;
   a second operating system;
   a screen; and
   a controller, comprising a memory for storing a first brightness value of the first operating system, the controller is configured for determining whether the first operating system operates in a working mode, wherein
   in response to determining that the first operating system is operated in the working mode, the controller sends a brightness value request message to the first operating system for acquiring the first brightness value utilized by the first operating system operates in the working mode,
   in response to determining that the first operating system is not operated in the working mode, the first brightness value of the first operating system is read from the memory of the controller,
   the controller is used for adjusting the screen brightness from the first brightness value to a predetermined second brightness value, and adjusting the screen brightness from the second brightness value back to the first brightness value after the first operating system is switched to the second operating system.

18. The electronic device according to claim 17, wherein the device comprises a switching key for generating an operating system switching signal, and the switching key is a physical key disposed on the electronic device or a virtual key displayed on the screen of the electronic device.

19. The electronic device according to claim 17, wherein the controller comprises an EC.

20. The electronic device according to claim 17, wherein the electronic device is a notebook, a UMPC, or a PDA.

21. The electronic device according to claim 17, wherein the controller further comprises a PWM module for gradually adjusting a brightness value of the screen of the electronic device.

* * * * *